H. W. SABIN.

Horse Hay-Rakes.

No. 5,245. Reissued Jan. 21, 1873.

Witnesses.
C. F. Brown.
Melville Church.

Calista E. Cox
Executrix of
H. W. Sabin.
By Attys.
Hill & Ellsworth

AM. PHOTO-LITHOGRAPHIC CO. N.Y. (OSBORNE'S PROCESS.)

UNITED STATES PATENT OFFICE.

CALISTA E. COX, OF WEST SOMERSET, NEW YORK, EXECUTRIX OF HARVEY W. SABIN, DECEASED.

IMPROVEMENT IN HORSE HAY-RAKES.

Specification forming part of Letters Patent No. 7,813, dated December 3, 1850; extended seven years, and again extended seven years by act of Congress from June 8, 1872; reissue No. 5,245, dated January 21, 1873.

DIVISION D.

*To all whom it may concern:*

Be it known that HARVEY W. SABIN, late of Canandaigua, in the county of Ontario and State of New York, now deceased, was the inventor of certain new and useful Improvements in Horse Hay-Rakes, for which Letters Patent of the United States were granted him for the term of fourteen years from the 3d day of December, 1850, and that the said patent was duly renewed and extended for the term of seven years from and after the expiration of the first term—to wit, from December 3, 1864—and was again extended by the Commissioner of Patents, by virtue of a special act of Congress, for the further term of seven years from and after the 8th day of June, A. D. 1872; and I, CALISTA E. COX, of West Somerset, in the county of Niagara and State of New York, executrix of the last will and testament of said HARVEY W. SABIN, deceased, and sole owner of the extended term of said Letters Patent, do hereby declare the following to be a full, clear, and exact description of the construction of that part of the invention which I designate a "tubular-joint rake-tooth," reference being had to the accompanying drawing and letters of reference marked thereon forming part of this specification, in which—

Figure 3:
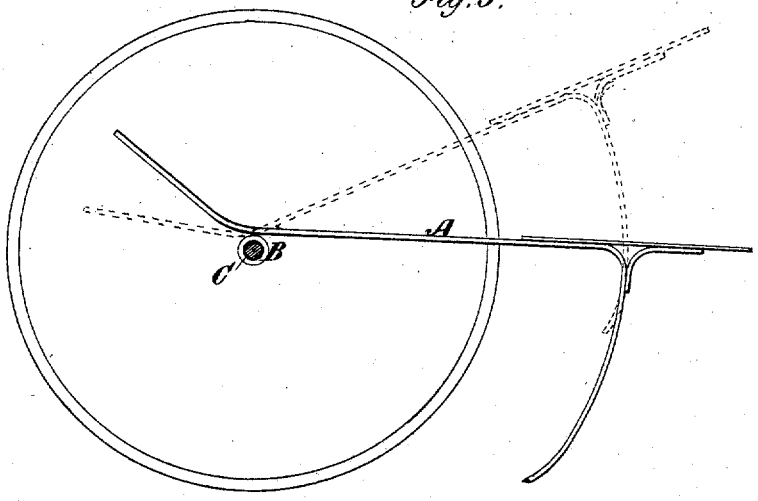
Figure 2:
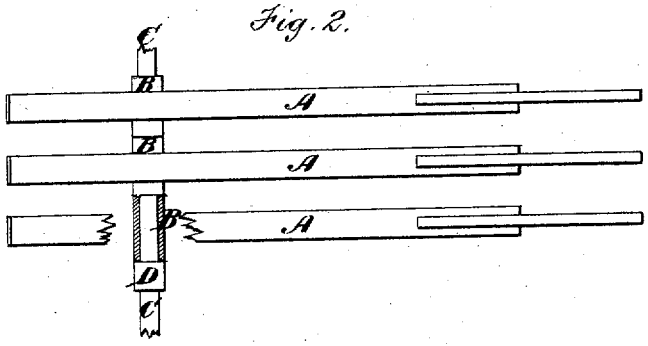
Figure 1:
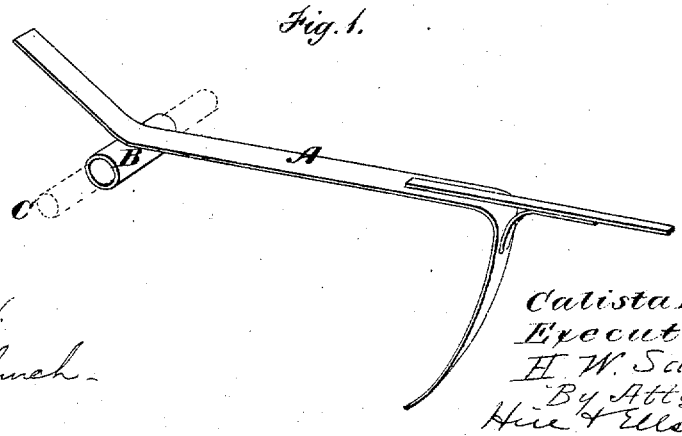

Figure 1 is a perspective view of a rake-tooth with a tubular eye-bearing applied to it; Fig. 2 is a plan view, showing a portion of the axial shaft of the rake-teeth, and also several tubular-joint teeth arranged to articulate upon this shaft—one of the tubular joints or eye-bearings is shown in section, and a portion of one of the teeth is broken out at said joint; and Fig. 3 is a vertical longitudinal section of a portion of a wheeled rake with tubular-joint rake-teeth arranged upon the carriage-axle.

Similar letters of reference in the several figures indicate corresponding parts.

The nature of the invention covered by this patent consists in arranging springy metal rake-teeth on their articulating and laterally bracing and supporting eye-bearings, in such a manner that the attaching end of the teeth shall cross or intersect a vertical plane passing longitudinally through the axis of the bearings.

To enable others skilled in the art to make and use this invention, I will proceed to describe the same with reference to the drawing.

It is important to have rake-teeth light and springy, and at the same time firm against lateral movement and strain, when in the act of raking or gathering hay; also to have such teeth set or spaced apart on their supporting-shaft in order that the rake shall be light. It is further important to have the teeth capable of collective and independent articulation in order that the teeth may singly or collectively rise to pass over unyielding obstructions, and that the gathered hay may be discharged; and it is further very important that the teeth may be attached to the tubular bearings in such a manner as to be capable of yielding from the points of their attachment to their gathering extremities, and at the same time be supported by a rod or axial shaft situated directly under the points where they attach to the eye-bearings.

In order, therefore, to produce a spring-rake combining the several important advantages above enumerated, the bearing B of each tooth A is made of a separate piece of metal from that of which the tooth is made; hence the tooth may be made of narrow spring metal, while its bearing, to which it is to be affixed, may be made of any desired metal, and of a length sufficient to give the tooth the necessary lateral support and bearing upon the axial shaft. The tooth is fixed in a secure manner to the bearing at the highest point thereof, or in a plane which intersects a vertical plane passing longitudinally through the axis of said bearing; and thus the necessity of inserting the end of the tooth into a horizontal tube of the eye-bearing, and thereby making a portion of the tooth stiff or rigid, and consequently liable to break under pressure, is obviated. Besides this, the tooth is sustained against the downward pressure which is brought upon it at a point between its gathering extremity and its attaching end.

To make the invention more plain, we will state that, through its agency, the attaching portion of the tooth can be made with a springy nature, and thus the whole tooth, from the point of its attachment to the tubular or laterally-bracing eye-bearing to its gathering extremity, is a spring of a capacity or volume much greater than is obtained in other teeth used upon a rod which is the same height from the ground as the rod on which this improved arrangement of tooth is placed. Besides this, the forward parts of teeth being attached circumferentially or tangentially to the bearings, the same are sustained directly upon the axial rod of said bearings; and thus not only may a firm connection between the teeth, their bearings, and their axial shaft be secured, but such a one as will sustain the teeth against all ordinary lateral thrusts and downward force of the pressure-bar, which is generally used to keep them to their work of gathering hay.

We have set forth the importance of making the raking contrivance of a hay-rake as light as possible; but as this must not be done at the expense of strength, it is a matter of no little importance to secure in the same implement both strength and lightness without increasing the cost of the same. These essentials are attained by using the laterally-bracing eye-bearings and fastening the teeth to them in such a manner that their attaching ends will cross or intersect the vertical plane of said bearings, or so that the weight of the forward parts of the teeth will fall directly over or on the bar upon which the bearings are placed and upon which they articulate, and thus any pressure which may be applied between the attaching and raking ends will be borne by said rod in such manner that the breaking of the teeth will seldom if ever occur. The rake-teeth are represented as having their support upon the carriage-axle C of the rake in such manner that each tooth may articulate freely thereon.

For raising the rake-teeth collectively, a tilting frame may be arranged to articulate upon the axial shaft of the teeth, so as to operate with a downward pressure, at the will of the operator, upon the forward extension of the teeth; and for keeping the teeth down to their work a pressure-frame may be arranged to articulate upon the axle and press down upon the teeth in rear of the axle. The said tilting frame and the pressure-frame may be controlled by a hand-lever and a tripping device which articulate together upon the axle.

The arrangement of the tilting frame, pressure-frame, lever, and other contrivances is claimed under Division B of this reissue, to which reference is made for a more particular description thereof; but these devices constitute no part of the invention claimed under this patent.

Whenever it is desired to have the teeth placed or spaced a greater distance apart than the length of the eye-bearings will permit, rings D may be introduced between the abutting ends of the bearings, as indicated in the drawing.

The series of tubular or eye bearings for a series of spaced rake-teeth are held together against longitudinal displacement on their axial shaft by means of stops, which, in this case, are the hubs of the wheels of the rake-carriage.

In Fig. 2 the manner in which the teeth are arranged upon the axial shaft is clearly shown, and in Fig. 3 the position of the teeth while raking is represented by black lines, and their position while discharging their load of gathered hay is shown by dotted lines.

What I claim, and desire to secure by Letters Patent, is—

Rake-teeth arranged on articulating tubular laterally-bracing and vertically-supporting eye-bearings, so that the attaching end of each tooth shall cross or intersect a vertical plane passing longitudinally through the axis of the bearings, substantially as described.

CALISTA E. COX, *Executrix.*

Witnesses:

REUBEN TENNY,
JOHN R. JESSON.